L. T. BOWMANN.
FLEXIBLE METALLIC DIAPHRAGM.
APPLICATION FILED SEPT. 11, 1915.
1,190,716.
Patented July 11, 1916.
2 SHEETS—SHEET 1.
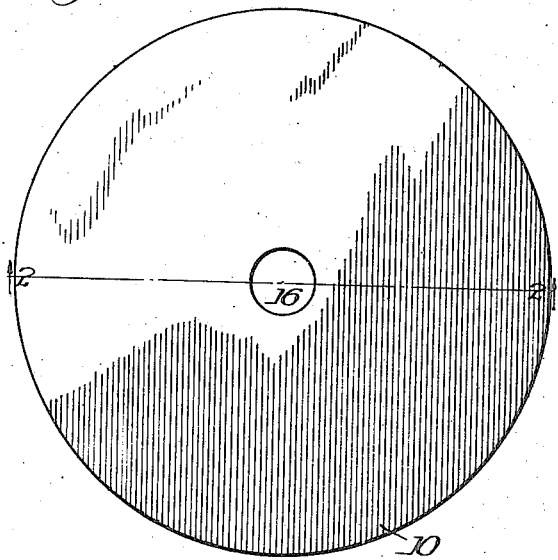
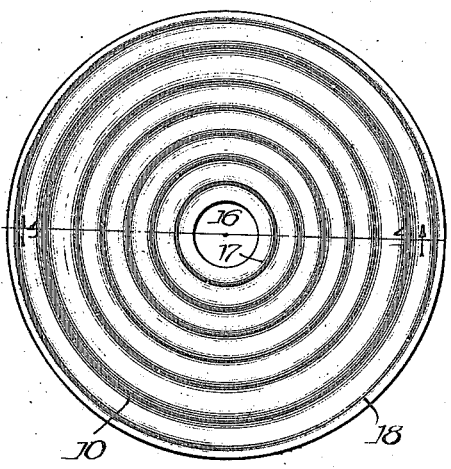
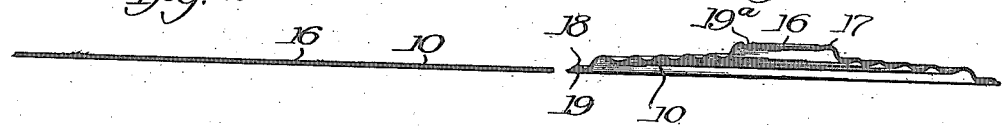
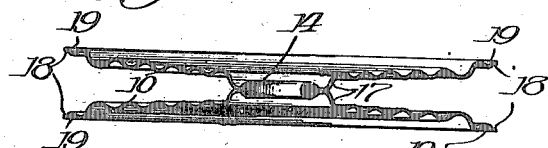

L. T. BOWMANN.
FLEXIBLE METALLIC DIAPHRAGM.
APPLICATION FILED SEPT. 11, 1915.
1,190,716.
Patented July 11, 1916.
2 SHEETS—SHEET 2.
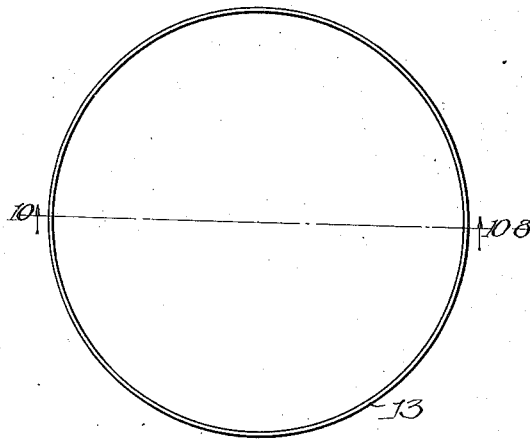
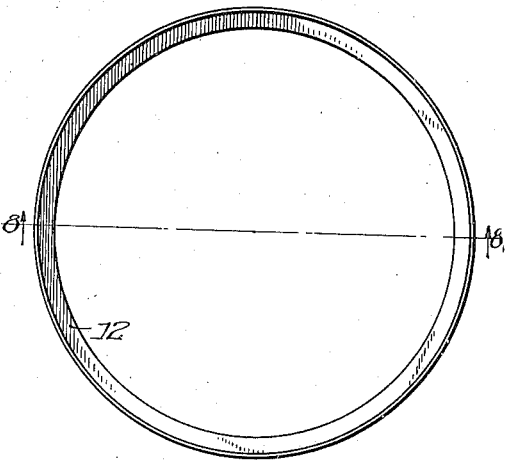
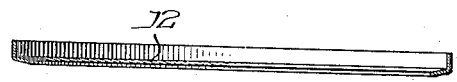
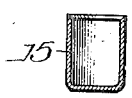
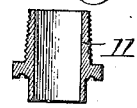
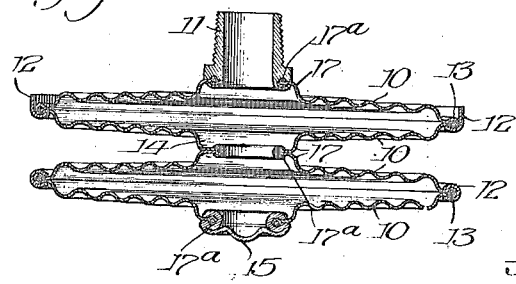
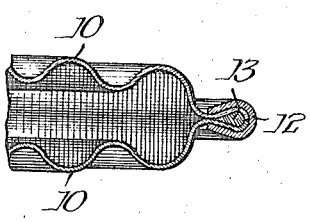

UNITED STATES PATENT OFFICE.

LOUIS T. BOWMANN, OF CHICAGO, ILLINOIS.

FLEXIBLE METALLIC DIAPHRAGM.

1,190,716.

Specification of Letters Patent. Patented July 11, 1916.

Application filed September 11, 1915. Serial No. 50,134.

*To all whom it may concern:*

Be it known that I, LOUIS T. BOWMANN, a citizen of the United States, and resident of Chicago, in the county of Cook and State of Illinois, have invented certain new and useful Improvements in Flexible Metallic Diaphragms, of which the following is a specification.

My invention relates to a novel flexible metallic diaphragm and has particular reference to an improved form of connection between the parts thereof.

In heat-regulating systems of different types it very frequently becomes necessary to utilize some form of diaphragm, and as such devices are often exposed to extremes of temperature which tend to cause the deterioration of diaphragms composed of leather, rubber, or other organic material, it has been proposed to utilize metallic diaphragms, and this invention has for its object the production of a plurality of flexible metallic diaphragms which shall possess the requisite qualifications of resiliency, long life and economy in original cost.

A further object is to provide, without the aid of a fused medium, a diaphragm, the joints in which shall be impervious to fluids under pressure. The formation of the disks composing a metallic diaphragm is not difficult, but the problem of joining adjacent disks at their peripheries and axes without a fused medium becomes difficult. The disks have been joined heretofore by spinning and by soldering, but each method has its objections, not the least of which is that of cost.

An object in the present construction is to provide a diaphragm of this sort so constructed as to permit of the formation of the complete article by the use of stamping and forming dies. Beyond the first cost entailed in the production of the dies, the diaphragms may be produced very cheaply. The method of assembling the complete article by the use of dies is a more or less complex one and was only conceived after a long period of experiment and study.

The article will be more clearly understood by reference to the accompanying drawings, wherein—

Figure 1 is a plan view of a disk as delivered from the blanking die; Fig. 2 is a section on the line 2—2 of Fig. 1; Fig. 3 is a plan view of the disk after the corrugating die has acted thereon; Fig. 4 is a section on the line 4—4 of Fig. 3; Fig. 5 is a sectional view through two combined disks; Fig. 6 is a sectional view through the bushing, which after being re-formed into an eyelet, joins two adjacent disks at their centers. Fig. 7 is a plan view of the preliminary shape of the ring used for joining two opposed disks at their peripheries; Fig. 8 is a section on the line 8—8 of Fig. 7; Fig. 9 is a plan view of the metal ring used at the joint; Fig. 10 is a section on the line 10—10 of Fig. 9; Fig. 11 is a sectional view through the thimble which, after being re-formed, is used to close the center of the lowermost disk; Fig. 12 is a similar view through the threaded bushing, which, when secured in the axial opening through the uppermost disk, provides the inlet to the diaphragm; Fig. 13 is a sectional view through the practically complete diaphragm, and Fig. 14 is an enlarged sectional view of a fragment of a completed diaphragm.

In the drawings it will be seen that I utilize a plurality of disks 10, a bushing 11, a clamping member 12 for the peripheries of the disks, a metal gasket or packing ring 13, an eyelet 14 for joining the disks at their centers, and a cap 15 for closing the axial opening in one of the disks. In the beginning of the operation I provide round disks 10 of thin gage metal, each being provided with an axial opening 16. The disks are placed between suitable dies and corrugated and crimped to the form shown in Fig. 3. Each of these disks is provided with a laterally-deflected annular portion 17 and with a peripheral flange 18, the portions 17 and 18 being crimped to provide suitable depressions or grooves 19, 19$^a$. The intermediate corrugations in the disk may be made more or less pronounced if desired, but for ordinary work the corrugations shown will be found adequate. In the next step two disks so formed are located with their axial projections 17 in alinement, and a metal gasket 17$^a$ is placed in peripheral grooves surrounding the axial openings. The bushing 14 is then inserted in the aperture 16 in the disk. This bushing 14 has been previously formed to the shape shown in Fig. 6. After the bushing and gasket have been located, the disks are placed in a suitable die and the lower portion of the bushing is flanged to the shape shown in Fig. 5, the portions of the metal surrounding the openings through the disks being securely clamped in place and the metal gasket pressed into and filling the grooves and sealing the joint. The material of which the eyelet is composed is preferably a good quality of brass or bronze and should be of substantial thickness. It has been found that a joint such as described is impervious to gas under pressure.

Assuming that a combination such as shown in Fig. 13 is to be formed, the next step is to provide for the formation of the fluid-tight chamber by locating a third disk beneath the two joined disks heretofore described. Such a disk as shown in Fig. 13 is a duplicate of those described, the axial opening in the disk being closed by the brass cap 15. It is shown in its original form in Fig. 11 and is applied to the disk by suitable dies before the disk is united at its rim to the adjacent disk. After the opening through this disk has been closed by the cap, the disk is laid alongside the lower of the disks shown in Fig. 5, a ring of metal having been previously located in the groove 19 of one of the disks. Thereupon the annular ring 12, shown in Figs. 7 and 8, is located in proper position and a forming die exerts its force to fold the vertical flange of the ring inwardly, thus squeezing the edges of the disks tightly together and forcing the gasket to fill all interstices and make an absolutely fluid-tight joint. The finished joint is best shown in Fig. 14, and it will be seen that the construction prevents relative movement of the disks at their peripheries. This is an advantage in that leakage after extended use due to wear is obviated. The gasket which we prefer to employ is constructed of soft metal, such as lead, but it will be understood that it is practical to employ a gasket of metal which is harder than the metal composing the disks.

The pile of disks may be made as high as desired, i. e., there is no limit to the number which may be combined in the manner described. I have, however, shown in Fig. 13 but two fluid chambers. The closure for the top, as shown in that figure, consists of a disk, a duplicate of those described, the axial opening therethrough accommodating a threaded bushing 11, the original shape of which is shown in Fig. 12. This is formed into the shape shown in Fig. 13 before the disk is combined with an adjacent disk. After this upper disk has been completed it is combined to the adjacent disk in the manner heretofore described. The clamping member for the peripheries of the disks will preferably be made of a rather heavy gage metal and when clamped on the thinner metal composing the disks serves to rigidly unite the same against all possibility of leakage. The operations described may be carried out by separate operations in separate appliances and as a result the cost of production is very small compared to the cost of producing the devices under the methods heretofore known. Furthermore, a much superior article is secured.

I claim:

1. A flexible metallic diaphragm, including a plurality of corrugated disks having axial openings therein, an eyelet joining adjacent disks at their axes, and a clamping ring joining said disks at their peripheries, and a gasket interposed between the peripheral edges of said disks, whereby the edges of the disks are sealed and rigidly held against relative movement, substantially as described.

2. In a multiple metallic diaphragm, the combination of a plurality of corrugated metallic disks having axial openings, each disk being laterally deflected at its periphery to provide a groove, an eyelet joining two disks at their axes, a ring joining the peripheries of adjacent disks, and a metal gasket interposed between the disks at their peripheries, the parts being shaped and combined by die action thus producing a compartment or a series of inter-communicating compartments gas tight without introduction of a fused medium, substantially as described.

3. In a multiple metallic diaphragm, the combination of a plurality of corrugated metallic disks having axial openings, each disk being laterally deflected at its periphery to provide a groove, an eyelet joining two disks at their axes, a ring joining the peripheries of adjacent disks, and a metal gasket interposed between the disks at their peripheries, and other joints, the parts being shaped and combined by die action, the compartment thus formed being gas tight without the introduction of a fused medium, substantially as described.

Signed at Chicago, Illinois, this 8th day of Sept., A. D. 1915.

LOUIS T. BOWMANN.

Witnesses:
CHAS. P. MURRAY,
T. D. BUTLER.